Oct. 27, 1931.   L. C. REESE   1,829,670
BAKING OVEN
Filed May 2, 1930   6 Sheets-Sheet 1

INVENTOR
Louis Charles Reese

INVENTOR
Louis Charles Reese

Oct. 27, 1931.  L. C. REESE  1,829,670
BAKING OVEN
Filed May 2, 1930   6 Sheets-Sheet 5

INVENTOR
Louis Charles Reese

Oct. 27, 1931.  L. C. REESE  1,829,670
BAKING OVEN
Filed May 2, 1930  6 Sheets-Sheet 6

INVENTOR
Louis Charles Reese,

Patented Oct. 27, 1931

1,829,670

UNITED STATES PATENT OFFICE

LOUIS CHARLES REESE, OF SAGINAW, MICHIGAN, ASSIGNOR TO BAKER PERKINS COMPANY, INCORPORATED, OF SAGINAW, MICHIGAN, A CORPORATION OF NEW YORK

BAKING OVEN

Application filed May 2, 1930. Serial No. 449,199.

This invention relates to improvements in baking ovens, in which articles or materials of any kind are baked, dried or otherwise heat-treated by continuously withdrawing from the baking chamber containing them a portion of its atmosphere, reheating the withdrawn portion, and then returning the reheated gases to the baking chamber, and refers particularly to the kind of oven described in the United States Patent No. 1,544,481, granted to me on June 30, 1925.

The object of my invention is to render the baking or similar operation considerably more effective and economical than was possible hitherto, and to accelerate the same.

For obtaining this object, I arrange the baking chamber longitudinally in the oven, withdraw continuously a portion of the gaseous contents of the baking chamber by means of a fan or other circulating means through outlets provided in the baking chamber and connected to the inlet of the fan or the like in such a manner, as to produce an even withdrawal from all points of the baking chamber. The fan or the like forces then the withdrawn gases through a reheater, for instance a superheater, heat exchanger or similar apparatus, where they are heated to the temperature necessary for baking the articles within the baking chamber. The reheated gases are then led through a suitable system of pipes to separate stationary heat distributors, so arranged within the baking chamber and so adapted as to spread the reheated gases directly and evenly all over the exposed surfaces of the articles being baked.

Waste gases escaping from the furnace or the like of the reheater are used to preheat the gases passing from the baking chamber to the fan or other circulating means and from there to the reheater by arranging the channels, tubes or the like, through which these gases pass, within the flues, which lead the waste gases to the chimney. A similar arrangement serves to preheat by the same means steam or other gaseous fluids, which may be desired to be introduced into the baking chamber directly, or to be added to the circulating gases on their way from the latter to the reheater.

For fully explaining my invention, I describe in the following by way of example its application to bread baking ovens illustrated in the accompanying drawings, in which:—

Fig. 4 is a section on line 4—4 of Fig. 1 showing the means to introduce steam or the like directly into the baking chamber;

Fig. 5 is a section on line 5—5 of Fig. 1, showing the outlet for the surplus gases in the top of the door opening of the oven, while

Fig. 10 is a plan view of a unit of a multiple heat distributor as shown in Fig. 1, the distributing plate having been removed therefrom; Fig. 11 is a cross section of a pair of such units on line 11—11 of Fig. 10, Fig. 12 a front view of the same, and Fig. 13 a section on line 13—13 of Fig. 10, showing the inner side of the back plate of an element;

Fig. 14 is a cross section and Fig. 15 a front view of a single heat distributing element, similar to the unit shown in Fig. 10;

Fig. 16 is a cross section and Fig. 17 a front view of a single heat distributing element, in which its bottom and sides are made of one piece of a suitably curved plate;

Fig. 18 is a cross section of a multiple heat distributor composed of elements like that shown in Figs. 16 and 17;

Fig. 19 is a cross section and Fig. 20 a front view of a single heat distributing element similar to, but more flat than that shown in Fig. 17 and provided with only a single equalizing tube;

Fig. 21 is a cross section, Fig. 22 a front view and Fig. 23 a plan of a simple heat spreader;

In all the figures similar numerals of reference designate corresponding parts.

In the drawings the numeral 1 indicates the baking chamber of a drawplate oven, 2 its front wall, 3 its back wall, 4 its top, 5 its bottom, 6 and 7 its side walls and 8 the opening, through which articles to be baked are introduced into and, after having been baked, removed from the baking chamber 1. For this purpose the articles are placed on a drawplate 9, the mechanism and operation of which is well-known.

Figure 1:
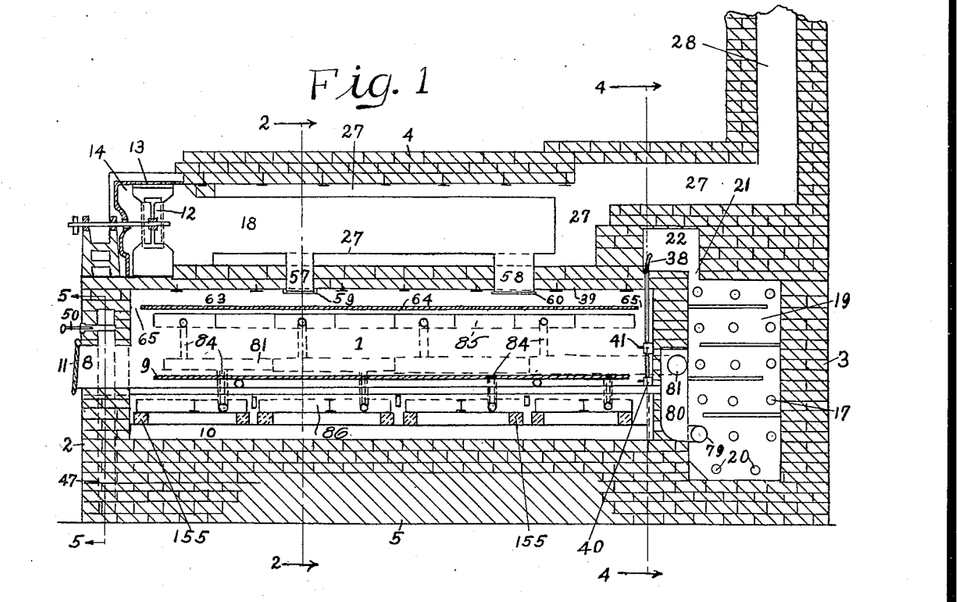
Fig. 1 is a vertical longitudinal section through the midst of an intermittently working oven, in which the goods to be baked are supported on a drawplate.
Figure 2:
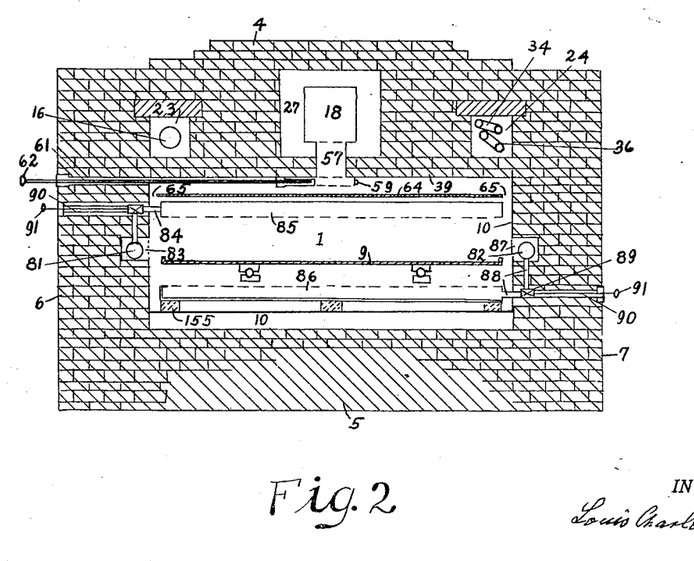
Fig. 2 is a transverse section on line 2—2 of Fig. 1.

The walls surrounding the baking chamber 1 are vapor-tight, and the ingress and egress of gases can only take place during the actual baking operation through openings and at points especially provided for this purpose. Any suitable material may be used for the construction of the oven, and any suitable method of making the walls of the baking chamber air-tight may be employed. In Figs. 1 and 2 the walls surrounding the baking chamber are made of bricks and are lined inside the same with suitable plates 10 preferably of thin metal sheeting joined in a vapor-tight manner. The door 11, covering the opening 8, through which the drawplate 9 enters and leaves the baking chamber, is also made air-tight, as is usually the case in this type of oven.

The front wall 2 of the oven carries on its top a blowing fan 12, the casing 13 of which is enclosed in the housing 14. The outlet port 15 of fan 12 protrudes from housing 14 and is connected by the duct 16 to a coil-shaped superheater 17. The housing 14 is only open at its side pointing towards the back of the oven, and the rim of this opening is tightly joined to the channel 18, which extends in the top of the oven longitudinally over the middle part of the baking chamber and is preferably constructed of rather thin metal sheeting. The channel 18 is connected to the baking chamber by branch tubes, through which fan 12 draws from the latter its gaseous contents.

The superheater 17 is located in a furnace 19, (Figs. 1 and 3), enclosed in the back wall 3 of the oven and fired by any suitable means; in Fig. 1 gas burners 20 arranged underneath the superheater 17 are shown as example. The waste gases leave the furnace 19 at its top through a narrow passage 21 extending for its whole length, enter the flue 22 running within the upper part of the back wall 3 across the whole width of the baking chamber 1, and pass at the opposite ends of flue 22 to flues 23 and 24 extending longitudinally within the top 4 of the oven directly above each side of the baking chamber 1 and having equal dimensions in regard to length and cross section, and thus practically the same capacity for the passage therethrough of the waste gases. At their front ends the flues 23 and 24 are connected by bends 25 and 26 to the main flue 27, which runs along and within the middle part of top 4 of the oven and surrounds the channel 18. The gases passing through the latter are thus preheated. The main flue 27 narrows after passing the closed back end of channel 18 and ends in the chimney 28 carried by the back wall 3 of the oven.

The duct 16 leading the gases from the fan 12 to the superheater 17 is provided near port 15 with the tightly closing gate valve 29, which serves for adjusting the quantity of gases passing to the superheater, and is operated by rod 30 and handle 31. For preheating the gases passing therethrough, duct 16 is placed within bend 25 and flue 23 and joined to the conical tube 32 situated within cross flue 22, and then connected at its narrow end with the corresponding inlet 33 to the superheater 17.

Figure 3:
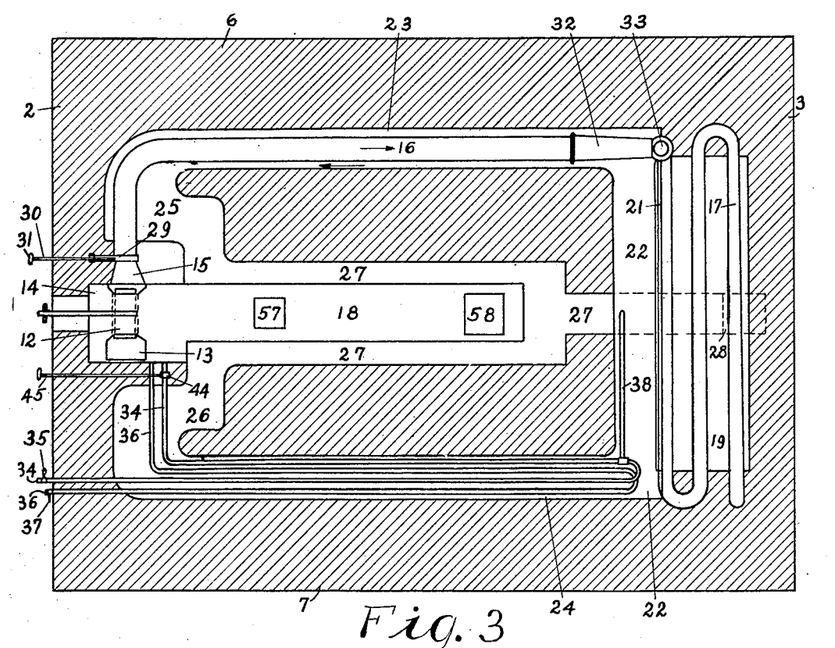
Fig. 3 is a plan of the interior of the oven top showing the arrangement of the various devices and channels used in circulating, preheating and finally reheating the gases.

In order to be able to change the composition of the atmosphere of the baking chamber, the gases required for this purpose are introduced into the circulating gases, preferably while traveling from the baking chamber to the fan. In a bread baking oven, in which the atmosphere must consist practically of steam only, it is necessary to make provision for the addition of steam. In special cases, as for baking certain cakes and biscuits an addition of air may be sometimes desired. Means for adding these two gases are shown in Fig. 3. Steam taken from any suitable outside source is led into the widened part of channel 18 near its connection to the housing 14 of fan 12 by the pipe 34 provided at its part protruding from the front 2 of the oven with the control valve 35. In a similar way air is introduced through the pipe 36 controlled by the slide valve 37. Both pipes, 34 and 36, extend from the oven front, where their controlling valves are situated, through the front wall 2 longitudinally within flue 24 into the cross flue 22, where they are turned backward, running again within flue 24, until they are bent sidewise into bend 26 and pass through intervening brick-work into channel 18. In this way gases introduced into the circuit from outside are preheated.

Figures 4, 5:
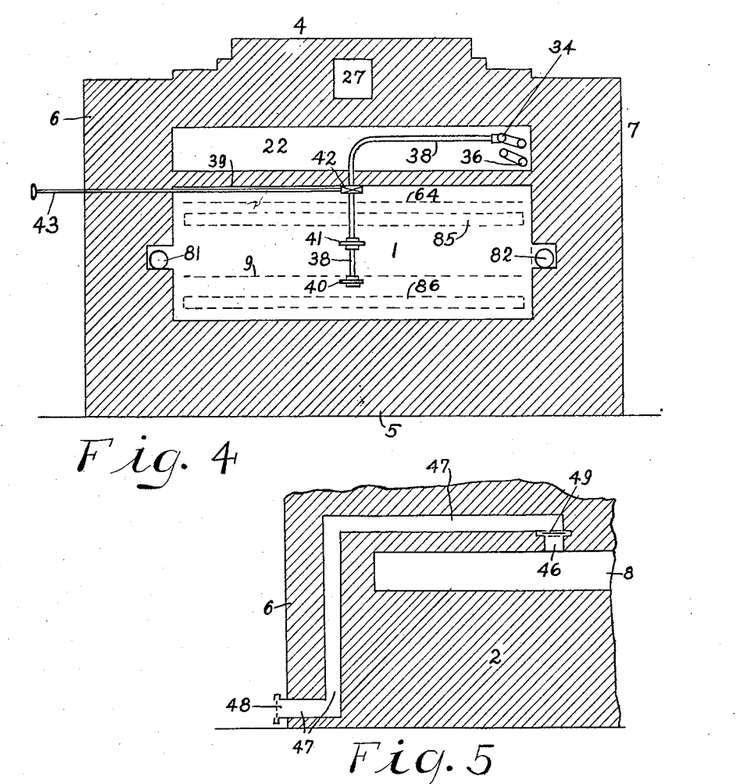

Under circumstances, especially when baking starts, it may be desirable to introduce steam directly into the baking chamber. For this purpose, pipe 34 is provided, as shown in Figs. 3 and 4 at a point within cross flue 22 with a branch pipe 38, which runs along the side wall of this flue until its midst, where it is turned vertically downwards, passing through the ceiling 39 of the baking chamber closely to the back wall of the latter to its closed end. This vertical part of branch pipe 38 is provided with two nozzles 40 and 41, adapted to spread the steam finely and widely within the baking chamber. Nozzle 40 is placed in branch pipe 38 below drawplate 9, and nozzle 41 above the latter and the articles being baked thereon. The quantity of steam introduced into the baking chamber through branch pipe 38 is controlled by valve 42 worked from the side of the oven by rod 43 and its handle. The valve 44 provided in pipe 34 near its entrance into channel 18 and operated from the front 3 of the oven by rod 45 and its handle serves to prevent steam from entering into channel 18, if it is desired to introduce it exclusively into baking chamber 1. By adjusting both the valves 42 and 44, the proportion of the quantities of steam entering into the channel 18 and the baking chamber 1 may be controlled.

The original volume of the gases enclosed in the baking chamber, in the superheater and in the channels, ducts and devices used for the circulation of the same is greatly increased by the heat imparted to them in the superheater. Gases emanating from the articles being baked and gases introduced from outside augment also considerably the volume of the gases in the baking chamber according to their quantity added in this way. While the oven is heated up, the pressure of the atmosphere within the baking chamber will therefore rise, until the desired baking temperature has been reached, and then fluctuate in accordance with alterations of this temperature, and to the quantities of gases emanating from the articles being baked and of the gases introduced from outside. To obtain a good result in baking ovens of this kind and especially those for baking bread, the pressure of the atmosphere within the baking chamber should be substantially equal to that of the outside atmosphere.

In order to maintain this equality of pressure, I provide in the baking chamber an outlet or outlets, through which the surplus gases escape into the outside atmosphere at a point considerably lower than the floor of the baking chamber. In the oven shown in Fig. 1, which is rather short and provided with a door closed during the baking operation, the outlet 46 for the surplus gases is preferably located in the midst of the top of the door opening 8, as shown in Fig. 5, and connected to a channel 47, which first runs upwards, turns horizontally sidewise into the side wall of the oven, leads therein downwards to nearly the floor, on which the oven stands, and, turning the sidewise, ends outside the oven in the free atmosphere. A screen 48 covers this end of channel 47 to prevent dust and dirt from entering therein. For controlling the quantity of gases passing through channel 47, I arrange in its first upward portion above the door a tightly closing gate valve 49 worked from the front of the oven by rod 50 and its handle.

Figure 6:
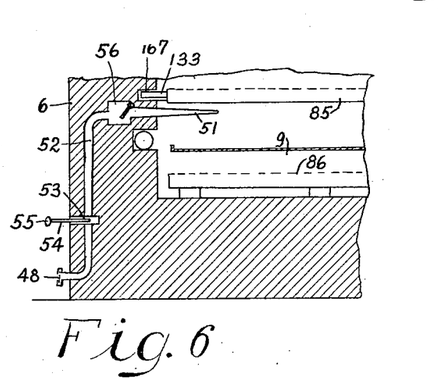
Fig. 6 shows an outlet for the same gases in a side wall of the baking chamber.

Fig. 6 shows an outlet for the surplus gases arranged in the side wall 6 of the oven and adapted to counteract the fluctuations of the pressure within the baking chamber. This outlet consists of the horizontal tube 51 joined at its end within the side wall 6 to a channel or tube 52 descending, like channel 46 described above, within the side wall 6 to a point sufficiently below the floor of the baking chamber and turning then sidewise into the free atmosphere. The tube 51 extends preferably into the space between the top of the articles being baked and the upper row of heat distributors indicated by the numeral 85, and is in this part broadened and conical in vertical cross section, ending in a broad tip closely perforated or provided with a long narrow slot for the inlet of the gases. This end tip is preferably placed vertically beneath the interval between two adjacent heat distributors or units of the same. The channel 52 is provided, like channel 46, with a gate valve 53 operated by rod 54 and handle 55 for regulating the quantity of gases passing therethrough and at its outside end with a screen, like 48 in channel 46, for preventing dust and dirt from entering the same. In each outlet channel I provide an automatic flap valve 56, as shown in Fig. 6 for channel 52, which opens when the pressure of the gases within the baking chamber is higher than that of the atmosphere outside and closes, when the pressure in the baking chamber is equal to or lower than the latter.

In order to draw from the baking chamber the gases, which have been used for baking and cooled thereby, as evenly as possible, I arrange underneath its ceiling a special chamber consisting of one compartment or a plurality of the same for collecting therein the gases to be reheated, and connect this chamber by one or more tubes with the channel 18, from which the gases are drawn by fan 12.

Figure 7:
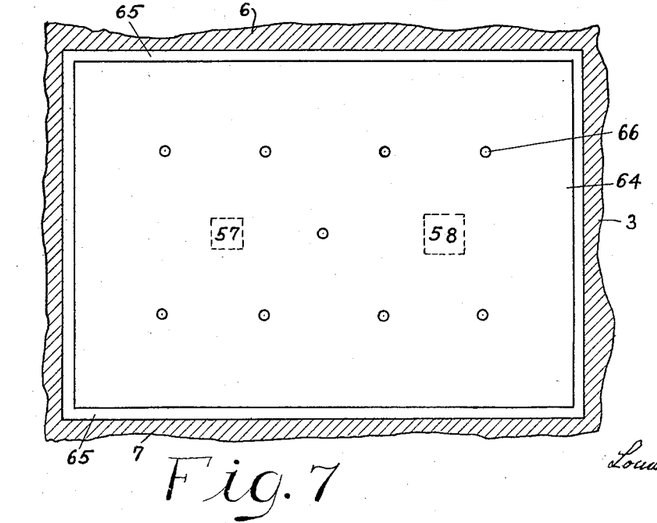
Fig. 7 is a plan of a partition plate arranged below the ceiling of the baking chamber.

In Figs. 1, 2 and 3, the gases are led from the baking chamber to the channel 18 by tubes 57 and 58, the dimensions of which are arranged so that practically equal volumes of gases will pass through each. At their ends protruding slightly from the ceiling 39, the tubes are provided with adjustable slide valves, tube 57 with slide valve 59 and tube 58 with slide valve 60. Both are worked from the side of the oven, as is shown in Fig. 2 for valve 59, which is operated by rod 61 and handle 62. For forming a single collecting chamber 63, as mentioned above, a partition plate 64 is arranged at a short distance from and parallel to the ceiling 39 and suspended therefrom in any convenient way. For the passage of the gases into the collecting chamber, the plate 64 is placed at such a distance from all the upright walls of the baking chamber, that the same are evenly drawn therefrom. In the plan of plate 64 shown in Fig. 7, the interstices of the plate from the walls of the baking chamber are indicated by numeral 65, and the position in regard to the same of tubes 57 and 58 in dotted line. If desired, the plate 64 may also be provided with openings 66 regularly distributed therein and serving as additional passages for the upward movement of the gases into the collecting chamber.

Figure 8:
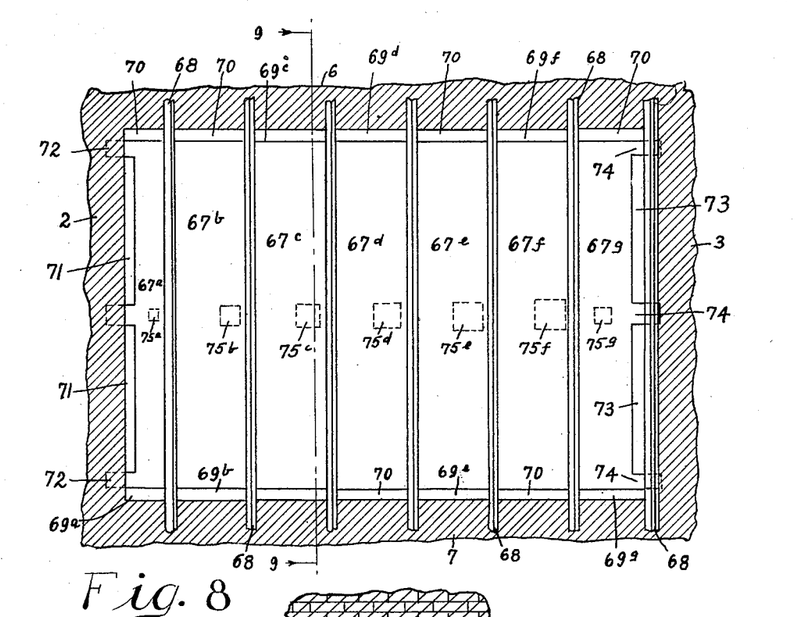
Fig. 8 is a plan of a plurality of chambers formed beneath the ceiling of the baking chamber by employing its supports.
Figures 9, 24:
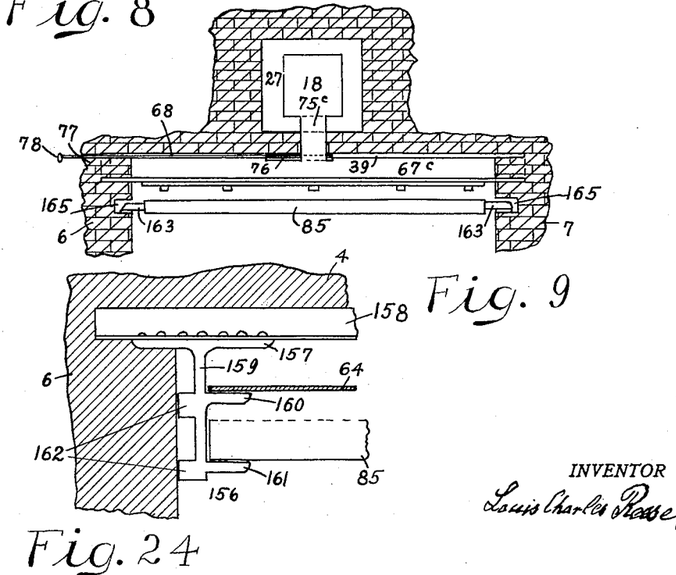
Fig. 9 is a vertical cross section on line 9—9 of Fig. 8.
Fig. 24 is a side view of a bracket supporting the partition plate and heat distributor in the upper part of the baking chamber.

Figs. 8 and 9 show a simple construction for the formation of a plurality of collecting chambers 67, numbered as 67$^a$ to 67$^g$ in Fig. 8, by fixing to the lower flanges of the I-beams 68, which carry the ceiling 39 on their upper flanges, partition plates 69, numbered 69$^a$ to 69$^g$ in accordance with the chambers formed. All these plates, when in position, leave at their sides equal and sufficient intervals 70 from the side walls 6 and 7 for the passage of the gases along the same. The two end plates, 69$^a$ at the front and 69$^g$ at the back of the baking chamber, are fixed with one side to the lower flanges of the I-beams 68 nearest to them; the opposite side of plate 69$^a$ pointing towards the fron wall 2 is cut so as to form two open spaces 71 for the passage of the gases and to leave three tongues 72 fixed in the front wall 2. In a similar way the plate 69$^g$ is cut away to form at the back wall 3 two openings 73, while its three tongues 74 are fixed in the back wall 3. For each collecting chamber 67 an outlet tube 75 of such dimensions, as will correspond to the position and size of the chamber, is provided, in Fig. 8 these outlets are indicated by numerals 75$^a$ to 75$^g$. Each outlet 75 is provided at its end protruding from ceiling 39 with a slide valve 76, Fig. 9, which is operated from the side of the oven by rod 77 and handle 78. Adjacent collecting chambers of this kind may be connected, and only one outlet provided for two or more of them.

Figs. 1 and 2 show by way of example arrangements and devices for efficiently distributing the gases coming from the superheater 17 within the baking chamber 1 round the articles being baked.

The reheated gases leave the superheater 17 at its lower end, the outlet 79, enter the short distributing duct 80 enclosed in back wall 3 between the superheater and the back of the baking chamber, and pass from there into the mains 81 and 82 (Fig. 2) of equal construction and dimensions. Both mains start at opposite sides of duct 80 and turn, when reaching the side walls of the oven, towards the front thereof. Main 81 runs in a recess 83 provided in side wall 6 and is connected by branch pipes 84 alternately pointing upwards and downward to alternate elements of the upper row 85 of heat distributors arranged at a suitable distance above the top of the loaves being baked on drawplate 9, and to alternate elements of the lower row 86 of heat distributors located beneath drawplate 9. Main 82 is led in recess 87 along the side wall 7 and is connected by similar alternate branch pipes 88 to the opposite ends of the remaining alternate elements of the two rows 85 and 86 of heat distributors. The mains 81 and 82 are preferably composed of sections decreasing in bore towards their closed ends near the front of the baking chamber in such a manner that the reheated gases pass through the branch pipes 84 and 88 into the rows of heat distributors 85 and 86 under practically the same pressure.

The branch pipes 84 and 88 consist each of two parts, an upright one issuing from the main, and a horizontal one connected to a single element of the heat distributors, the two parts of each pipe being connected by a suitable valve 89 regulating the flow of the hot gases from the main to the element and worked from the side of the oven by rod 90 and handle 91.

Figures 10, 11, 12, 13, 14, 15, 16, 17, 18, 19, 20, 21, 22:
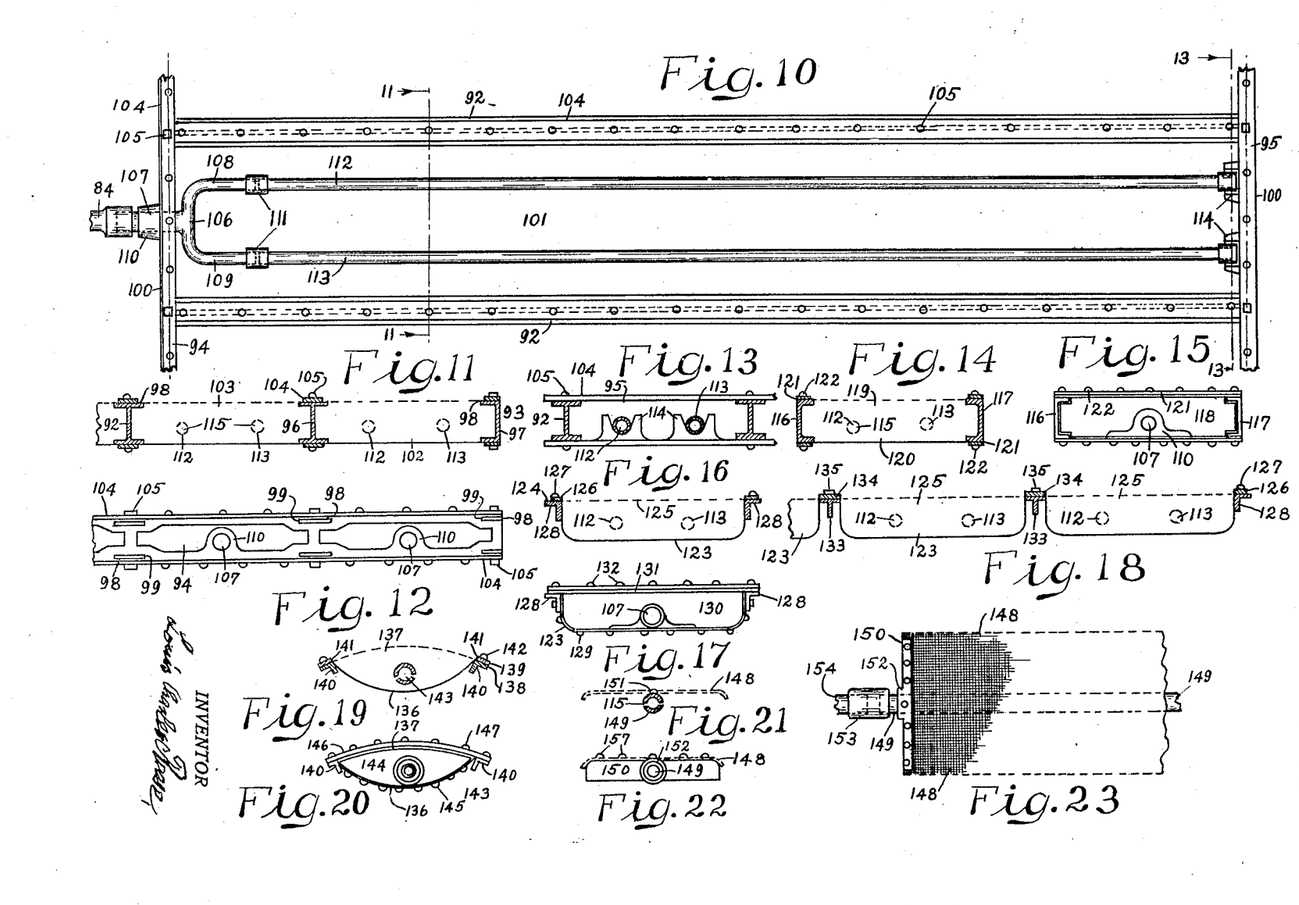

The uper row of heat distributors indicated by numeral 85 in Fig. 1 is formed by a single multiple heat distributor composed of eight separate elements, while the lower row of heat distributors, indicated by numeral 86, is composed of four multiple distributors, each consisting of two separate elements. The details of the construction of this kind of multiple heat distributor is shown in Figs. 10 and 13 and Fig. 18. It is obvious that, instead of multiple heat distributors also rows of single heat distributors or any other type of heat distributor may be employed with the same result. The choice of the construction details and arrangement of the heat distributors used depends in each case on the type and size of the oven and its baking chamber and on the requirements of the baking operation to take place therein.

In general I prefer a heat distributor consisting essentially of a metal box covered tightly with a screen, a perforated plate, a sheet of wire gauze or the like, through the openings of which the reheated gases enter into the baking chamber, and containing means connected to the branch pipe leading the reheated gases into the box and adapted to spread the same evenly throughout the latter and over the underside of the screen. The means serving this purpose, as shown in the drawings are "equalizing pipes", which consist of single pipes or several pipes joined together and are so constructed and arranged and provided with openings of such a size and position therein that the reheated gases entering the box are as equally as possible distributed throughout the same.

The heat distributing elements are arranged in substantially parallel rows preferably extending, one above and one below the articles being baked, horizontally across nearly the whole width of the baking chamber, leaving between their ends and the side walls of the latter sufficient space for the movement therethrough of the gases forming the atmosphere of the baking chamber.

The multiple heat distributor shown in Fig. 1 is formed, as partly illustrated in Figs. 10–13, in its middle part of the required number of equally long and high I-beams 92, and at its ends of corresponding channel irons 93, the ends of the I-beams and channel irons being joined at one side of the row by a front plate 94 and at the opposite side by a back plate 95. These plates are rigidly fixed to the I-beams 92 and channel irons, which are all parallel to each other, by cutting away the web 96 of the former and 97 of the latter for a short distance and fastening the remaining flat ends of their flanges 98 in corresponding recesses 99 provided in the front and back plate in alignment with each other. Both these plates are provided at top and bottom with flanges 100 pointing outwardly from the structure, which forms the frame of a number of parallel separate compartments 101, each serving as a single heat distributor. Instead of closing the ends of the compartments 101 by the front plate 94 and back plate 95, a separate plate may be placed tightly between each adjacent pair of flanges of the I-beams 92 and channel irons 93 near their ends, which, protruding from these separate plates may then be supported in recesses of the baking chamber. The construction remains otherwise quite the same, and, if the I-beams and channel irons used therein are of sufficient strength, they may be used for supporting rails or other accessories used in the baking chamber. Each of the compartments 101 is covered at its bottom 102 by an imperforate metal plate and at its top 103 by a sheet of wire gauze or a suitably perforated plate. The bottom plate 102 and top plate 103 are fixed at their side edges in the middle part of the distributor to corresponding flanges of adjacent I-beams 92 and in the two end elements of the distributor at one side to one of such flanges and at the opposite side to corresponding flanges of the channel iron 93, and at their front and back end to corresponding flanges of the front plate 94 and back plate 95. Any means may be employed to fix the bottom and top plates to the frame of the distributor. I preferably use for this purpose metal strips 104 and set screws 105.

A very effective and at the same time simple and convenient type of equalizing pipes is shown in plan in Fig. 10, in which the perforated top plate 103 has been omitted. The inlet pipe 106 is shaped like a fork consisting of the stem 107 and two parallel branches 108 and 109. The stem 107 is screw-threaded and meshes with the inner threads of the openings in the projection 110 provided in the middle part of the front plate 94 of the element. The end of 107 protrudes outside the latter and meshes with the screw threads provided in the cup-like end of the branch pipe connected to the main receiving the hot gases from the superheater, as for instance in Fig. 2 branch pipe 84 extending from main 81. The branches 108 and 109 are of equal bore and diameter and screw-threaded at their ends and joined by unions 111 to the screw-threaded ends of the tubes 112 and 113, which are closed at their opposite ends and rest with the latter on bracket-like projections 114 provided at the inner side of the back plate 95. The tubes 112 and 113, as also, if convenient and advisable, the branches 108 and 109, are provided with suitable apertures 115 of such a size and shape and so arranged that the reheated gases issuing from the same are evenly distributed throughout the element. Preferably the apertures 115 are located at opposite sides of the tubes 112 and 113 so that the heating gases are driven therefrom in opposite directions.

Figs. 14–17 show single heat distributors, in which the same kind of equalizing pipes is used as described in the preceding paragraph.

The sides of the heat distributor, Figs. 14 and 15, are formed by two channel irons 116 and 117, facing each other and joined at their ends, so as to form a box, by means of short front and back plates 118 fitting tightly into the channel ends, the top and bottom edges of the former being flush with the corresponding flanges of the latter. The top of the element is formed by the perforated plate 119 or the like and its bottom by the imperforate plate 120, these plates being fixed to the corresponding flanges of the channels 116 and 117 and edges of the front and back plate 118 by metal strips 121 and set screws 122 similar to those mentioned before.

A lighter and simpler construction of the same type of heat distributor is shown in Figs. 16 and 17. Instead of a square box, I form the element as a trough, the bottom and sides of which consist of a suitably curved thin metal plate 123. The sides of the latter are turned over sidewise so as to form flanges 124, on the top of which wire gauze sheet 125 or the like is stretched. The flanges 124, the side edges of the wire gauze sheet 125 on top of the same and metal strips 126 on top of the latter are fixed together by set screws 127 or the like on the horizontal legs of angle irons 128 extending for the whole length of the element, and, if desired, beyond the same. The curved ends of the trough 123 are closed by fixing them by set screws 129 on the correspondingly curved rims of stout front and back plates 130 snugly fitting into the curvature of the trough edges and aligned at their top with its flanges 124. The edges of the front and back of the wire gauze sheet 125 are fixed onto the top rims of the plates 130 by means of metal strips 131 and screws 132.

Fig. 18 shows a multiple heat distributor, in which elements of the type as shown in Figs. 16 and 17 are connected to each other by fixing the flanges 124 of the trough plates 123 of two adjacent elements on top of the flanges of steel T's 133 by means of metal strips 134 and set screws 135.

Figs. 19 and 20 show the construction of a similar type of single heat distributor, but of a much smaller capacity. The imperforate plate 136 forming the side and bottom of the same is very flatly curved, so that the upright parts of its side have disappeared, and also the screen 137 is flatly curved in a similar way. The flanges 138 of the former and side edges 139 of the latter are fixed on the inclined legs of angle irons 140 by means of metal strips 141 and screws 142. The element has only a single equalizing tube 143. The ends of the plate 136 are fixed at the front and back of the element onto the correspondingly curved lower rims of the stout plates 144, arranged at back and front of the element, by screws 145, and the ends of the screen 137 onto the correspondingly curved upper rims of plates 144 by metal strips 146 and screws 147.

In all the heat distributors of this type all the points, where the surfaces to be connected require a vapor-tight joint, are made tight by employing any suitable heat-resisting packing. Asbestos packing treated in the usual way is generally quite sufficient for this purpose.

In the box-shaped heat distributors described above by far the largest portion of the heat contained in the reheated gases entering the same is transmitted to the cooler atmosphere of the baking chamber, when the reheated gases leave the distributors and then mix therewith; a smaller, but frequently not inconsiderable portion of the original heat of the hot gases will pass through the imperforate walls of the heat distributors into the cooler atmosphere surrounding them during the time, in which the reheated gases travel through and thus remain, if only for a short interval, in the interior of the heat distributors. This additional transmission of heat attributes greatly to the even heating of the atmosphere throughout the baking chamber and makes it possible to attain its proper baking temperature by using a smaller volume of reheated gases coming from the reheater at a higher temperature. The amount of heat transferred through the imperforate walls of a heat distributor depends greatly on the area of the surfaces of its walls and their adjuncts in heat conducting communication therewith, the velocity, with which these gases pass through the heat distributor, and on the capacity of the latter.

Figs. 21, 22 and 23 show a simpler, but not quite so efficient means for distributing the reheated gases entering the baking chamber through an equalizing tube. It consists of a spreader plate 148 formed of a perforated sheet or wire gauze and placed on the equalizing tube 149 closed at one end and extending beyond both ends of plate 148. The latter is preferably bent downwardly at its sides and is held on tube 149 at each end by short end plates 150, to the top rims of which the end edges of the spreader plate are fixed by screws 151. The end plates 150 are provided each in their midst with an annular projection having an opening 152, in which the equalizing tube 149 is tightly fixed. The latter is connected by a union 153 to a branch pipe 154 extending from the main receiving the reheated gases from the reheater.

The heat distributors are, as mentioned above, supported within the baking chamber by any suitable means in such a manner that ample intervals are left between the sides of the former and the walls of the latter for the passage of the gases. In Fig. 1 the lower row 86 of heat distributors are supported on the floor of the baking chamber by blocks 155 made of heat insulating material, and the upper row 85 together with the partition plate 64 on brackets 156 shown in Fig. 24. The bracket 156 is riveted with its winged upper part 157 to the supports 158 consisting of I-beams, T-irons or the like, which carry the ceiling of the baking chamber. The downwardly pointing main part 159 of the bracket has two arms 160 and 161 extending towards the middle of the baking chamber. The arms 160 are nearest to the ceiling and carry the partition plate 64, and the lower arms 161 support the heat distributor 85. Projections 162 provided at the side of bracket 156 pointing towards the side wall 6 of the baking chamber rest against the same, thus contributing to the stability of the structure.

Figure 25:
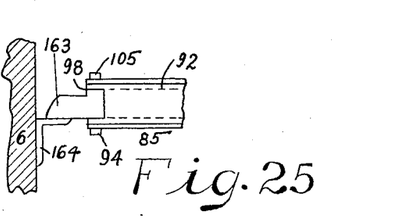
Fig. 25 is a side view of a modified arrangement for supporting a heat distributor located in the upper part of the baking chamber.

Fig. 25 shows a different arrangement for supporting the upper heat distributor 85, in which the end plates at the front and back of the latter are provided with projections extending towards the side walls of the baking chamber and resting on angle irons fixed horizontally thereon. In the figure the projection 163 is provided at the front plate 94 at the point, where the flanges 98 of the I-irons 92 are fixed in recesses 99 of the same, and is supported on the horizontal leg of the angle iron 164 rigidly attached to the side wall 6, sufficient space having been left between the outstanding edge of the angle iron 164 and the sides of the heat distributor for the free movement therethrough of the gases. Instead of using angle irons as supports, the projections 163 of the distributor may be made somewhat longer and carried on the bottom of recesses 165 provided in the side walls of the baking chamber, as shown in Fig. 9.

The heat distributors may also be supported in recesses of the side walls of the baking chamber by the prolonged ends of I-beams, T-irons, angle irons, channel irons or the like forming the longitudinal parts of their framework. An example is shown in Fig. 6, in which the T-irons 133 forming part of the framework of the multiple heat distributor 85 represented in Fig. 18 project at both ends 166 from the end plates and are supported in recesses 167 of the side walls.

The intermittently working oven described above is tightly closed during the baking operation. Every opening of the door of the baking chamber for charging and discharging will more or less alter the atmosphere therein, and, if the door remains open for some time, it will be necessary to adjust the circulating and heating devices accordingly. In the modern continuous ovens, in which the goods to be baked are carried through the baking chamber by a conveyer, the openings provided for the charging and discharging of the goods must always be sufficiently open for this purpose during baking time. I have provided means to prevent these openings from having any damaging effect on the atmosphere within the baking chamber during its circulation.

Figures 26, 27, 28:
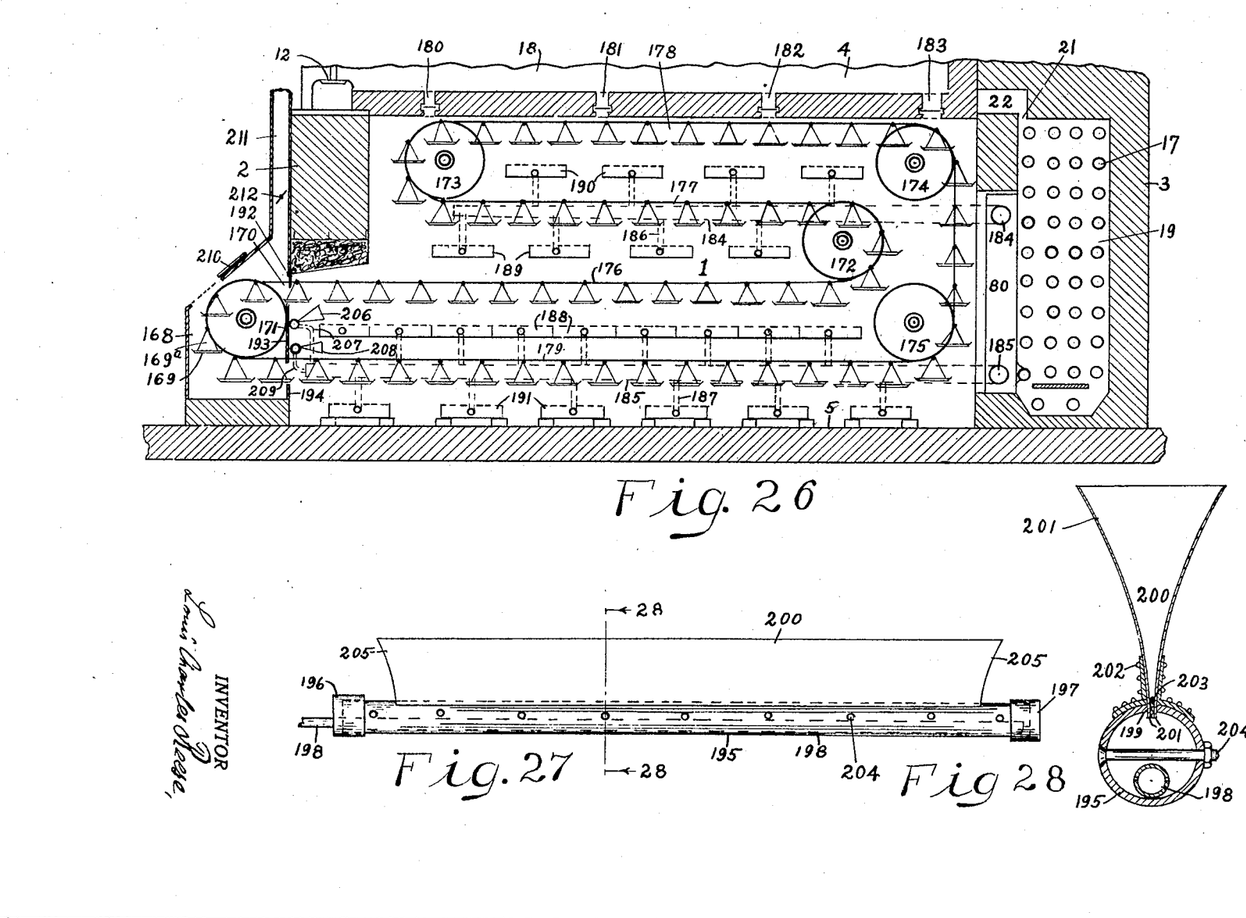
Fig. 26 is a longitudinal vertical section of a traveling tray oven, the upper part of its top being omitted. The figure shows the arrangement of the circulating, reheating and heat-distributing devices preferably used in this type of oven.
Fig. 27 is a side view of a special type of a heat distributor, arranged in or near the openings of traveling ovens and adapted to direct the reheated gases onto a certain predetermined area.
Fig. 28 is a cross section of Fig. 27 on line 28—28.

Fig. 26 shows as example of a continuous oven, in which my invention is employed, a tray traveling oven of well-known type, which is commonly used for baking bread. The devices used in circulating and reheating the atmosphere of the baking chamber and their arrangement therein are mostly similar to those described for the drawplate oven; the equivalent main parts and devices used in the former are therefore designated by the same numerals as those in Figs. 1–8 illustrating the latter.

The front wall 2 of the oven is open in its lower part for the passage therethrough of the conveyer carrying the articles to be baked through the baking chamber 1, which, by means of this opening, is connected to a small forechamber 168, in which the trays 169 revolubly mounted on the conveyer chains 170 are loaded and unloaded. The conveyer chains 170 run over five sprockets wheels 171—175, one of which, 171, is placed in the forechamber 168, while the other four 172—175 are located within the baking chamber 1. These sprocket wheels are so arranged that the conveyer forms four flights 176—179. The goods to be baked enter the baking chamber in the first flight 176 extending substantially in a horizontal direction from the top of the sprocket 171 to the bottom of sprocket 172, and are carried on the latter upwards to the second flight 177 extending horizontally from the top of sprocket 172 to the bottom of sprocket 173, then upwards again on the latter and horizontally through the third flight 178 extending from the top of sprocket 173 to that of sprocket 174, then vertically downwards to sprocket 175, and finally again horizontally through the last flight 179 extending from the bottom of sprocket 175 to the bottom of sprocket 171 in the forechamber 168, where the ready baked goods are removed from the trays, and the latter reloaded. The gaseous contents of the baking chamber 1 are drawn from the same by means of a fan 12, situated on top of the front wall 2 of the oven, through the adjustable outlets 180, 181, 182 and 183 and the channel 18 connected with the same, and then driven by the fan to the superheater 17, where they are reheated to the required temperature. The superheater 17 is heated by the furnace 19, and both are located in the back wall 3 of the oven. The waste combustion gases leave the furnace 19 at its top through the passage 21 to the flue 22 connected to flues arranged in the top of the oven for leading the waste gases finally to the chimney, and so arranged and adapted as to heat the top of the baking chamber and to preheat gases led by pipes therethrough as described above for the drawplate oven.

The gases reheated in the superheater 17 enter from its lower part into the distributing duct 80 and are led from there through the main pipes 184 and 185 and branch pipes 186 and 187 respectively connected thereto to the heat distributors by means of which the baking chamber 1 is heated to and maintained at the proper baking temperature. The heat distributors are arranged in four superimposed rows 188, 189, 190 and 191. The row 188, located underneath the trays on flight 176 carrying the fresh goods into the baking chamber, and at some distance above the top of the goods on the last flight 179, must supply the largest amount of heat and is therefore shown as preferably composed of distributors connected with each other. The other rows of distributors, 189 between flights 176 and 177, 190 between flights 177 and 178, and 191 supported on the bottom 5 of the baking chamber below flight 179, consist each of the required number of spaced separate heat distributors The open space between the baking chamber 1 and the forechamber 168 is as far as possible closed by three baffle plates 192, 193 and 194 fixed to the outer surface of the sides of the oven front and extending across the whole width of the baking chamber 1. Baffle plate 192 extends from the lowest point of the upper part of oven front 4 downwards nearly to the tops of the articles entering the baking chamber on flight 176, and is provided in known manner with cut-outs for the passage therethrough of the conveyer chains and upper part of the hangers 169ª carrying the trays 169. Baffle plate 193 extends with its upper edge closely to the line along which the bottoms of the trays 169 travel on flight 176, and with its lower edge closely to the tops of the articles on conveyer flight 179, and is provided with cut-outs like plate 192. Baffle plate 194 extends from the bottom 5 of the baking chamber closely to the line along which the bottoms of the trays 169 on flight 179 pass. Though there remains comparatively little space at the front of the baking chamber 1 for the undue escape therefrom of its gaseous contents and for penetration of the outside atmosphere into the same, it is advisable to provide within the front opening of the baking chamber special heat distributing tubes adapted to direct over a wide area covering the remaining open spaces a gentle current of the reheated gases into the baking chamber, thus effecting that practically only the surplus of its gaseous contents is removed from the baking chamber, and the pressure therein remains equal to that of the outside atmosphere.

Figs. 27 and 28 illustrate a special heat distributing and directing tube answering the purpose described in the previous paragraph; it consists of a wider tube 195, closed at its ends by caps 196 and 197 and extending across the whole width of the baking chamber 1, and of the inner equalizing tube 198 having a considerably smaller diameter than the surrounding outer tube 195, placed against the inner surface of the latter, tightly fixed with its open end in a suitable opening in cap 196 and provided with duly arranged apertures, so arranged and adapted as to equally spread within tube 195 the reheated gases coming through a branch pipe from their main supply pipe.

The outer tube 195 is provided opposite to the inner tube 198 with a slot 199 extending practically the whole length of tube 195 and containing the lower ends of a flow directing channel 200 shaped in cross section not unlike that of a funnel of a Venturi tube, and fixed with its side walls 201 to the tube 195 by brackets 202. The lower ends of the side walls 201 are spaced apart, and enclose wire gauze 203 or some other suitable means for equalizing throughout the whole length of the slot the quantity of reheated gases forced therethrough, the whole structure being kept in place by pressing the sides of slot 199 against the outer surfaces of the ends of the side walls 201 by screw bolts 204 passing through tube 195. The side walls 201 are connected at their ends by end walls 205, both being so shaped and arranged that the reheated gases flowing therefrom cover the whole area to be effected thereby.

In Fig. 26 the two heat distributing and directing tubes of the type shown receive the reheated gases required at the end of main supply pipe 185, the upper one, 206, through branch pipe 207 and the lower one, 208, through branch pipe 209. The flow directing channel of tube 206 is turned upwardly and influences the space between the end element of the row 188 of heat distributors, and the upwardly and inwardly inclined top of the opening in front wall 2, and that of tube 208 is directed sidewise and influences the space between the trays on flight 179 and the bottoms of the heat distributing row 188.

The forechamber 168 is closed at its front and sides and provided in the usual way with a slanting hood-like roof 210 and with the necessary openings for charging and discharging the trays carried by the conveyer chains 170 running over sprockets 171. For the removal from the forechamber 168 of the hot surplus gases entering the same from the baking chamber, the hood 210 is provided at its highest point with an outlet flue 211 running upwardly along the oven front 2 and controlled by a damper 212.

The principle of construction of the devices necessary for the application of my invention and their arrangement within the baking chamber or in direct connection therewith are always substantially the same for every type of brake oven. The means for circulating the gaseous contents of the baking chamber and the means for reheating them are preferably placed outside the same, but are not bound to their positions as shown in the accompanying drawings, but may be located within or near any other parts of the oven walls, as long as they attain the same effect. The medium heating the circulating gases while passing through the reheater may consist of fresh combustion gases produced by burning in a furnace gaseous, liquid or solid fuel, of electricity or of any kind of waste gases having the required high temperature.

I claim:

1. A baking oven of the type described, having in combination a baking chamber horizontally disposed therein, a fan, a reheater, openings in said baking chamber, a system of tubes connecting the said openings with the inlet of said fan and so adapted and arranged that a portion of the gaseous contents of said baking chamber is continuously withdrawn therefrom evenly from all parts thereof, a tube connecting the discharging aperture of said fan to the inlet of said reheater, a main connected to the outlet of said reheater, a plurality of stationary heat distributors positioned within the said baking chamber, each having a spreading plate provided all over with very small apertures placed closely to each other, through which the hot gases coming from the reheater enter into said baking chamber, the spreading areas of these plates being of such a size, and the said heat distributors themselves being arranged in regard to the articles being baked in such a manner, that the latter are evenly heated to the required temperature, and a system of branch tubes connecting the said main to the said heat distributors.

2. A baking oven of the type described having in combination an elongated baking chamber enclosed therein, supports provided in said baking chamber for the articles to be baked, a plurality of spaced outlets arranged longitudinally in the ceiling of said baking chamber, a reheater arranged at one end of said baking chamber, means for circulating the gaseous contents of said baking chamber drawn from said outlets through said reheater, a main connected to the latter for carrying the reheated gases back to said baking chamber, two rows of separate heat distributors for spreading the reheated gases in the latter, one row being located between the tops of the articles being baked and the ceiling of said baking chamber, and the other one between the bottom of the latter and the said supports, branch pipes extending from said main, and connecting the latter with said heat distributors, and means provided in said branch pipes for controlling the quantity of reheated gases passing through the same.

3. A baking oven of the type described having in combination a baking chamber, a plate rigidly fixed at some distance from the ceiling of the latter, intervals being left between the side and end edges of said plate and the walls of said baking chamber for the free passage of gases between the spaces above and below said plate, a fan, spaced adjustable outlets provided in the ceiling of said chamber, a channel longitudinally arranged in the top of the oven, joined by separate tubes to said outlets, closed at one end and connected at its other end to the inlet of said fan, a reheater, connected at its inlet to the outlet of said fan, a main extending from the outlet of said reheater, heat distributors arranged within said baking chamber in close proximity to the goods being baked therein, and branch pipes leading the reheated gases from said main to said heat distributor spreading them widely and evenly over the surfaces of the goods being baked.

4. A baking oven of the type described having in combination a baking chamber, a plurality of I-beams, carrying on its upper flanges the ceiling of said baking chamber, plates fixed to the bottom flanges of said I-beams, intervals provided between the end edges of said plates and the side walls of said baking chamber, and between the end walls of the latter and the side edges nearest to the same of those of said plates located at the ends of said baking chamber, adjustable outlets, one provided in each of the compartments formed by the said I-beams and plates and the ceiling and side walls of said baking chamber, a fan, a channel arranged in the top of said baking chamber, joined by separate tubes to said outlets, closed at one end and connected at the other end to the inlet of said fan, a reheater connected at its inlet to the outlet of the latter, and a main leading the reheated gases from the outlet of said reheater back into said baking chamber.

5. A baking oven of the type described having in combination a baking chamber, a support therein for the articles being baked, two rows of separate heat distributors, one arranged above the tops of the articles being baked, and the other one below the support of the same, a fan, an outlet arranged in the ceiling of said baking chamber and connected to the inlet of said fan, a reheater, the inlet of which is connected to the outlet of said fan, two mains extending in the opposite side walls of said baking chamber and connected to the outlet of said reheater, branch pipes extending from each of said mains and connected to alternate heat distributors belonging to alternate rows, and means provided in each branch pipe for controlling the quantity of reheated gases passing into the heat distributor belonging thereto.

6. A baking oven of the type described having in combination, a baking chamber, a reheater located outside at one end of said baking chamber, means for circulating the gaseous contents of said baking chamber, located outside at the opposite end of the latter, a channel extending along the longitudinal middle line of the top of said baking chamber and connected by branches to said baking chamber and at one end to the inlet of said circulating means, the other end being closed, a tube connecting the discharge end of the latter with the inlet of said reheater, gaseous means of sufficiently high temperature to reheat the circulating gases in the latter, the used waste gases leaving at its top, a channel for collecting the same extending across the whole width of the baking chamber in the top of the oven, two flues extending from the said flue longitudinally above the sides of said baking chamber, one being passed through by said tube leading the gases to be reheated to the said reheater, a central flue surrounding the said channel and connected at one end to the said two side flues and at the opposite end to the chimney.

7. A baking oven of the type described having in combination, a baking chamber longitudinally enclosed therein, a reheater heated by fresh combustion gases, means for circulating the gaseous contents of said baking chamber through said reheater heated by fresh combustion gases, a channel leading the circulating gases from the upper part of said baking chamber to the inlet of said circulating means, a flue extending longitudinally in the top of the oven for removing the waste gases from the reheater, a pipe provided with a regulating valve, connected to an outside source of a gaseous fluid to be admixed to the gaseous atmosphere of said baking chamber, extending longitudinally backward and forward within said flue and entering said channel at a point near said circulating means, a branch pipe extending from said pipe and so arranged and adapted as to lead the preheated gaseous fluid from the latter into the said baking chamber, and means provided in said branch pipe to control the quantity of gaseous fluid passing into the same.

8. A baking oven of the type described having in combination a baking chamber, an apparatus for circulating the gaseous contents of the said baking chamber and for reheating them in that part of the apparatus located outside the latter, the pressure within the said baking chamber being kept substantially equal to that of the outside atmosphere, an outlet provided for the removal of a surplus of gases from said baking chamber, a channel connected to this outlet, running downwardly in the wall of the oven and issuing into the outside atmosphere at a point below the floor of said baking chamber, and an automatic valve arranged in said channel and adapted to open at a pressure in said baking chamber higher than the outside atmosphere, and to close again as soon as this pressure has been relieved.

9. A baking oven of the type described, having in combination a baking chamber, an apparatus for circulating the gaseous contents of the said baking chamber and for reheating them in that part of the apparatus located outside the latter, two rows of heat distributors for spreading the reheated gases within the baking chamber, one located above, and the other one below the articles being baked, the pressure within the said baking chamber being kept substantially equal to that of the outside atmosphere, an outlet provided in a side wall of said baking chamber for the removal therefrom of surplus gases, a channel connected to that end of said outlet located within the side wall, running downwardly in the latter and issuing into the outside atmosphere at a point below the floor of said baking chamber, a tube connected to the opposite end of said outlet, extending sidewise into said baking chamber and ending at a point between the said two rows of heat distributors, and means provided in said channel for controlling the quantity of gases passing from said baking chamber through said outlet.

10. A baking oven of the type described, having in combination a baking chamber, an endless chain conveyer carrying the goods to be baked through said baking chamber in zig-zag fashion in several superimposed, substantially horizontal flights, trays rotatably suspended from said conveyer and holding the goods to be baked, a reheater, means for circulating the gaseous contents of said baking chamber through said reheater, rows of stationary heat distributors, each consisting of an open box-like structure covered with a spreading plate provided with very small apertures arranged closely to each other, through which the reheated gases issue into said baking chamber, one row of said heat distributors being arranged underneath each flight of said conveyer and substantially parallel to the same, and means for leading the reheated gases from said reheater to the said heat distributors.

11. A baking oven of the type described, having in combination a baking chamber, a reheater, means for circulating the gaseous contents of said baking chamber through said reheater, a main located within a side wall of said baking chamber for leading the reheated gases back to the same, heat distributors extending across the said baking chamber and having a spreading plate facing the surfaces to be heated and end plates spaced from the side walls of said baking chamber, supports provided at these side walls for said heat distributors, branch pipes connecting the said main with said heat distributors through one of the closed ends thereof, means for equally spreading the gases entering each heat distributor throughout its interior, and means provided in said branch pipes for controlling the quantity of reheated gases entering said heat distributors.

12. A baking oven of the type described having in combination a baking chamber, a reheater, means for circulating the gaseous contents of said baking chamber through said reheater, a main located in a side wall of the said baking chamber for leading the reheated gases back to the same, heat distributors extending across the said baking chamber, each having a spreading plate facing the surface to be heated, and end plates spaced from the side walls of said baking chamber, supports provided in these side walls for said heat distributors, branch pipes, each connecting one of said heat distributors with said main, an opening in one of the end plates of each of said heat distributors, one of said branch pipes being tightly fixed therein, prolonged throughout the whole length of the heat distributor and provided with perforations so arranged as to spread the reheated gases passing therethrough evenly throughout the interior of the heat distributor.

13. A baking oven of the type described having in combination a baking chamber, a reheater, means for circulating the gaseous contents of said baking chamber through said reheater, a main connected to the outlet of the latter, a box-shaped heat distributor located in said baking chamber and consisting of two parallel channel irons, their flanges being aligned and facing each other, of two plates tightly fixed between the said channel irons so as to close their channels, the side edges of these plates being level with the outer surfaces of the corresponding flanges of said channel irons, of an imperforate plate fixed to one set of aligned flanges of said channel irons and to those edges level therewith of said plates, and of a spreading plate fixed to such opposite flanges and side edges, a branch pipe leading the reheated gases from said main into said heat distributor, and an opening provided in one of said end plates thereof adapted for the said branch pipe to be tightly fixed therein.

14. A baking oven of the type described having in combination a baking chamber, a reheater, means for circulating the gaseous contents of said baking chamber through said reheater, a main connected to the outlet of the latter, a multiple heat distributor located in said baking chamber, consisting of a number of independent elements, and composed of a plurality of parallel I-beams forming the side walls of the intermediate elements and one side wall of the two end elements, of two channel irons parallel thereto and forming the outer side walls of the end elements, the flanges of the I-beams and channel irons being aligned, of end plates closing the two ends of the I-beams and channel irons thus arranged, their side edges being level with the flanges of the same, of imperforate plates fixed to one set of the aligned flanges and side edges level therewith, and of spreading plates fixed to the opposite set thereof, and branch pipes leading the reheated gases from said main to the elements of said multiple heat distributor, an opening being provided in one end plate of each element of the same for the said branch pipes to be tightly fixed therein.

15. A baking oven of the type described having in combination a baking chamber, a reheater, means for circulating the gaseous contents of said baking chamber through said reheater, a main connected to the outlet of the latter, a box-shaped heat distributor located in said baking chamber and consisting of a curved trough-shaped bottom plate, of two angle irons, fixed with the downwardly pointing legs to the upright end parts of the sides of said curved bottom plate, of a spreading plate fixed to the sidewise pointing legs of said angle irons, and of two end plates closing the ends of the trough-like channel formed by said bottom plate and said spreading plate, a branch pipe leading the reheated gases from said main into said heat distributor, and an opening provided in one of the end plates thereof adapted for the said branch pipe to be tightly fixed in.

16. A baking oven of the type described having in combination a baking chamber, a reheater, means for circulating the gaseous contents of said baking chamber through said reheater, a main connected to the outlet of the latter, a multiple heat distributor consisting of a number of independent elements and composed of a plurality of curved trough-like bottom plates flanged at the ends of their sides and placed lengthwise closely together, of steel T's, to the flanges of which the flanges of adjacent bottom plates are fixed, of two angle irons, to the outwardly pointing legs of which the outer flanges of the bottom plates forming the ends of the structure are fixed, of spreading plates fixed over the flanges of these bottom plates on the afore-mentioned steel T's and angle irons, and of end plates closing the open ends of the troughs thus formed, branch pipes leading the reheated gases from said main to the elements of said multiple heat distributor, and openings provided in one of the end plates of the elements of the same for the said branch pipes to be tightly fixed in.

17. A baking oven of the type described having in combination a baking chamber, a conveyer carrying the goods to be baked through said baking chamber, an opening in an end wall of the latter for those flights of said conveyer passing through said opening to be charged and discharged, baffle plates arranged in this opening, one extending from the top of said opening closely to the tops of the goods on the upper flight, and a second one extending between the latter and the tops of the goods on the lower flight of said conveyer, and a heat distributing tube directing a current of reheated gases against remaining uncovered intervals in said opening so as to counteract the tendency of the hot gases within said baking chamber to escape therethrough to the outside atmosphere.

18. A baking oven of the type described having in combination a baking chamber, a reheater, means for circulating the gaseous contents of said baking chamber through said reheater, a main connected to the outlet of the latter, a heat distributing tube extending across said baking chamber and closed at both ends, a slot extending throughout the length of said tube, an opening provided at one end of the latter, a branch pipe connecting the said main with said opening, a tube of smaller diameter than said heat distributing tube, arranged within the latter opposite to said slot, connected to that end of said branch pipe projecting into said heat distributing tube and provided with perforations so adapted and arranged as to spread the reheated gases issuing therefrom evenly throughout the latter, and a flow directing channel consisting of two opposite plates as long as said slot and fixed therein with their spaced ends, their opposite ends being arranged at a distance from each other corresponding to the width of the area to be heated by said tube, and of two end plates fixed to the ends of their sides, the channel thus formed having a cross section like that of a funnel.

LOUIS CHARLES REESE.